(12) United States Patent
Dudar et al.

(10) Patent No.: US 10,385,795 B2
(45) Date of Patent: *Aug. 20, 2019

(54) FUEL TANK PRESSURE SENSOR RATIONALITY TESTING USING V2X TECHNOLOGY

(71) Applicant: Ford Global Technologies, LLC, Dearborn, MI (US)

(72) Inventors: Aed M. Dudar, Canton, MI (US); Fling Tseng, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/928,356

(22) Filed: Mar. 22, 2018

(65) Prior Publication Data

US 2018/0209368 A1 Jul. 26, 2018

Related U.S. Application Data

(63) Continuation of application No. 15/168,605, filed on May 31, 2016, now Pat. No. 9,926,875.

(51) Int. Cl.
| | |
|---|---|
| *G07C 5/00* | (2006.01) |
| *F02D 41/22* | (2006.01) |
| *B60K 15/03* | (2006.01) |
| *F02D 41/02* | (2006.01) |

(52) U.S. Cl.
CPC ............ *F02D 41/222* (2013.01); *B60K 15/03* (2013.01); *G07C 5/008* (2013.01); *B60K 2015/0319* (2013.01); *B60K 2015/0321* (2013.01); *B60K 2015/03197* (2013.01); *F02D 41/021* (2013.01); *F02D 2041/223* (2013.01)

(58) Field of Classification Search
CPC ................. F02D 41/222; F02D 41/021; F02D 2041/223; B60K 15/03; B60K 2015/03197; B60K 2015/0321; B60K 2015/0319; G07C 5/008
See application file for complete search history.

(56) References Cited

U.S. PATENT DOCUMENTS

| | | |
|---|---|---|
| 6,295,492 B1 | 9/2001 | Lang et al. |
| 8,342,157 B2 | 1/2013 | Der Manuelian et al. |
| 8,353,273 B2 | 1/2013 | McLain et al. |

(Continued)

*Primary Examiner* — Anne M Antonucci
(74) *Attorney, Agent, or Firm* — Julia Voutyras; McCoy Russell LLP

(57) ABSTRACT

Methods and systems are provided for conducting a fuel tank pressure transducer rationality test diagnostic procedure in vehicles with sealed fuel tanks. In one example, vehicle-to-vehicle (V2V) or vehicle-to-infrastructure-to-vehicle (V2I2V) technology may be utilized to obtain fuel tank pressure transducer data from a select crowd of vehicles, where the select crowd may be based on the vehicles in the select crowd experiencing similar ambient temperature and weather as the vehicle being diagnosed. In this way, FTPT data from vehicles in the select crowd may be compared to FTPT data in the vehicle being diagnosed, in order to indicate whether the FTPT in the vehicle being diagnosed is functioning as desired, where such a diagnostic can be performed without unsealing the fuel tank on either the vehicle being diagnosed or the vehicles in the select crowd, and which may thus reduce undesired evaporative emissions.

19 Claims, 5 Drawing Sheets

(56) References Cited

U.S. PATENT DOCUMENTS

| | | | |
|---|---|---|---|
| 8,903,593 B1 * | 12/2014 | Addepalli | H04W 4/046 |
| | | | 701/29.1 |
| 9,217,397 B2 | 12/2015 | Peters et al. | |
| 9,751,396 B2 | 9/2017 | Dudar | |
| 2011/0230165 A1 | 9/2011 | Kleve et al. | |
| 2012/0152210 A1 | 6/2012 | Reddy et al. | |
| 2014/0303806 A1 | 10/2014 | Bai et al. | |
| 2015/0075251 A1 | 3/2015 | Jentz et al. | |
| 2015/0075267 A1 | 3/2015 | Sweppy et al. | |
| 2015/0075501 A1 | 3/2015 | Peters et al. | |

\* cited by examiner

FUEL TANK PRESSURE SENSOR RATIONALITY TESTING USING V2X TECHNOLOGY

CROSS REFERENCE TO RELATED APPLICATION

The present application is a continuation of U.S. patent application Ser. No. 15/168,605, entitled "FUEL TANK PRESSURE SENSOR RATIONALITY TESTING USING V2X TECHNOLOGY," filed on May 31, 2016. The entire contents of the above-referenced application are hereby incorporated by reference in its entirety for all purposes.

FIELD

The present description relates generally to methods and systems for diagnosing the functionality of a vehicle fuel tank pressure sensor based on crowd information.

BACKGROUND/SUMMARY

Undesired evaporative emission detection routines may be intermittently performed on a vehicle fuel system and emissions control system to confirm that the systems are not degraded. Undesired evaporative emissions detection routines may be performed while the engine is running using engine intake manifold vacuum. However, for hybrid-electric vehicles, engine run time may be limited. As such, undesired evaporative emissions detection routines may be performed when the vehicle is off using engine-off natural vacuum (EONV) generated due to a change in temperature and pressure within the fuel tank following engine shutdown and/or with vacuum supplemented from a vacuum pump. If the systems are sealed from atmosphere, a pressure or vacuum will develop there within responsive to changes in ambient temperature if the systems are intact.

Such routines rely on a functional fuel tank pressure transducer (FTPT) to measure the pressure or vacuum within the fuel system. As such, the rationality of the FTPT must be periodically tested and confirmed. The FTPT may be tested for offset, to determine if a baseline output of the FTPT is accurate. One example approach for an FTPT offset test is shown by Jentz et al. in U.S. Patent Application 2015/0075251. Therein, the fuel tank is vented to atmosphere for a lengthy vehicle-off soak. If the FTPT is functional, a value within a threshold of atmospheric pressure should be output following the vehicle-off soak. A deviation from atmospheric pressure may result in a diagnostic trouble code (DTC) being set at the controller, and/or may result in the FTPT output being adjusted to compensate for any offset.

However, the inventors herein have recognized potential issues with such systems. As one example, venting the fuel tank to atmosphere may result in fuel vapor trafficking to a fuel vapor canister. For vehicles with limited engine run-time, opportunities for purging the fuel vapor canister to engine intake may be limited. This could increase evaporative emissions if a saturated fuel vapor canister is exposed to multiple diurnal cycles. If the engine must be forced on to purge the canister, the fuel efficiency of the vehicle may be reduced.

In another example, U.S. Pat. No. 8,353,273 teaches coupling a fuel tank to a pump in order to generate a pressure signal in the fuel tank and at the position of the pump, and correlating fuel tank pressure with the pressure indicated at the pump. A fault signal may be generated responsive to the correlating.

However, the inventors herein have recognized potential issues with such a system. As one example, coupling the fuel tank to the pump may result in fuel vapors from the tank being routed to the fuel vapor canister, which is undesirable in vehicles with limited engine run-time, as discussed above. Furthermore, the use of an onboard pump adds costs and complexity to the engine system. A diagnostic that does not potentially load the canister and does not include the use of a pump is desirable.

In one example, the issues described above may be addressed by a method for a hybrid-electric vehicle, comprising indicating fuel tank pressure changes from a fuel tank pressure transducer (FTPT) coupled to a fuel tank of a vehicle being diagnosed; receiving fuel tank pressure indications from a select crowd of vehicles; and conducting a rationality test of the FTPT by correlating the indicated fuel tank pressure changes from the vehicle being diagnosed with indicated fuel tank pressure changes from the select crowd of vehicles to diagnose functioning of the FTPT.

As one example, the vehicle being diagnosed sends a request for indicated fuel tank pressure changes comprising a predetermined time period from each of the vehicles comprising the select crowd; wherein the vehicle being diagnosed receives the indicated fuel tank pressure changes wirelessly from each of the vehicles comprising the select crowd; wherein a controller of the vehicle being diagnosed generates an FTPT-based pressure change trend based on the combined data from each of the vehicles that comprise the select crowd; and wherein the generated FTPT-based pressure change trend is further compared to indicated fuel tank pressure changes in the vehicle being diagnosed in order to determine whether the FTPT in the vehicle being diagnosed is functioning as desired. In this way, the FTPT in the vehicle being diagnosed may be diagnosed without coupling the fuel tank of the vehicle being diagnosed to a fuel vapor canister of the vehicle being diagnosed, which may thus reduce undesired emissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
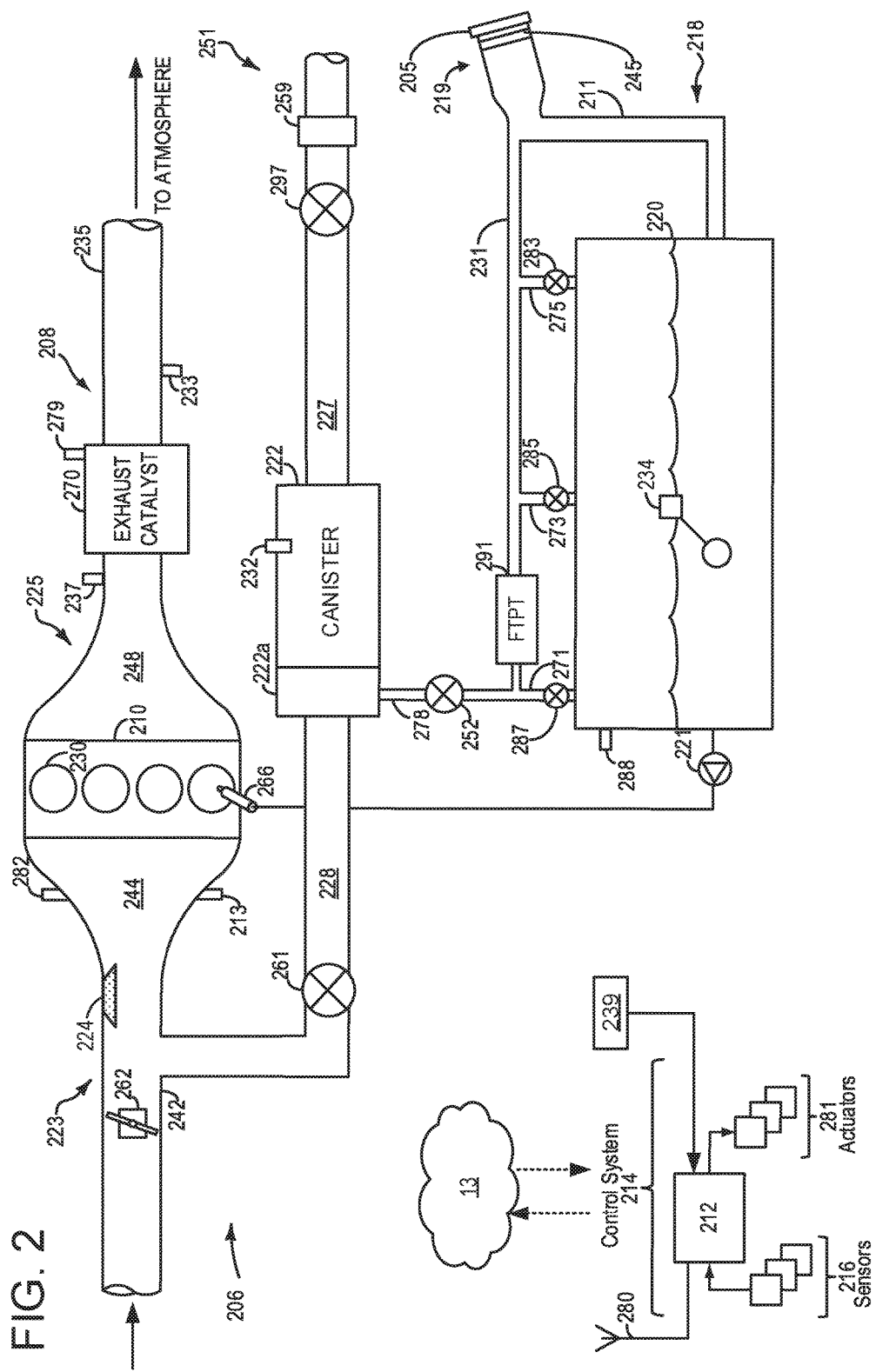
FIG. 2 schematically shows an example vehicle system with a fuel system and an evaporative emissions system.
Figure 3:
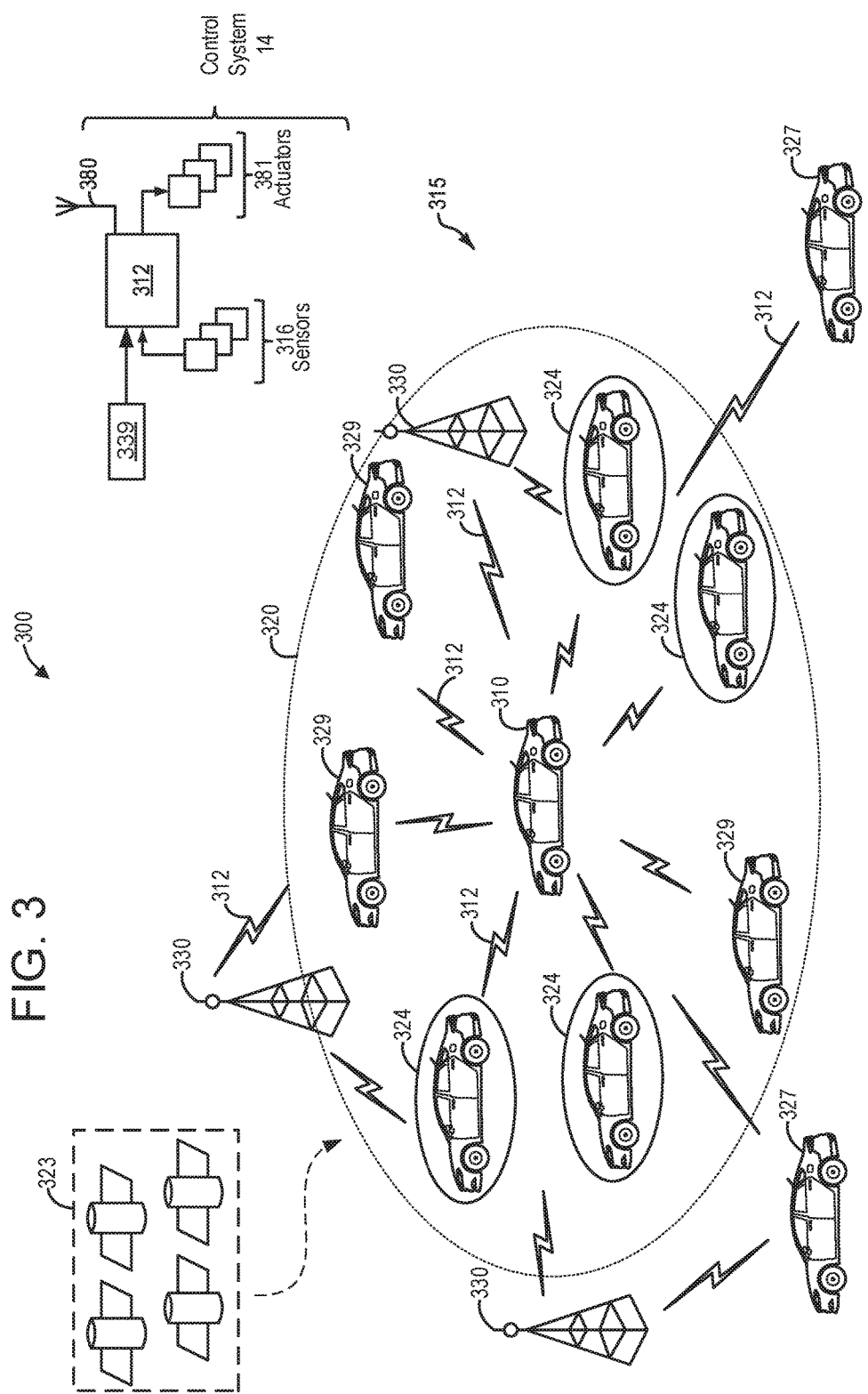
FIG. 3 schematically illustrates a system and methods for diagnosing a vehicle fuel tank pressure transducer using vehicle-to-vehicle (V2V) or vehicle-to-infrastructure-to-vehicle (V2I2V) technology.
Figure 4:
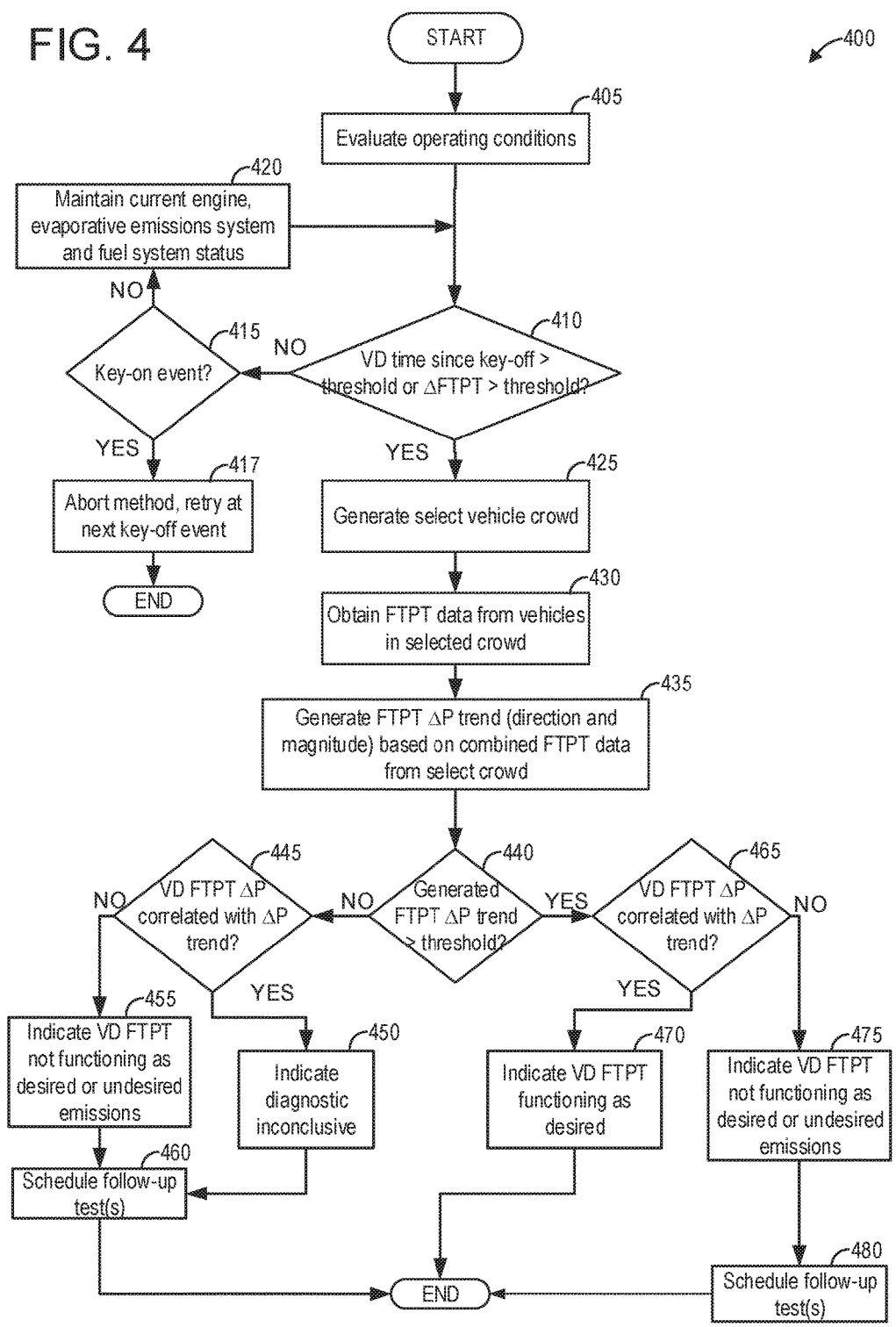
FIG. 4 depicts a flow chart for a high-level method for a fuel tank pressure transducer rationality test using V2V or V2I2V technology.
Figure 5:
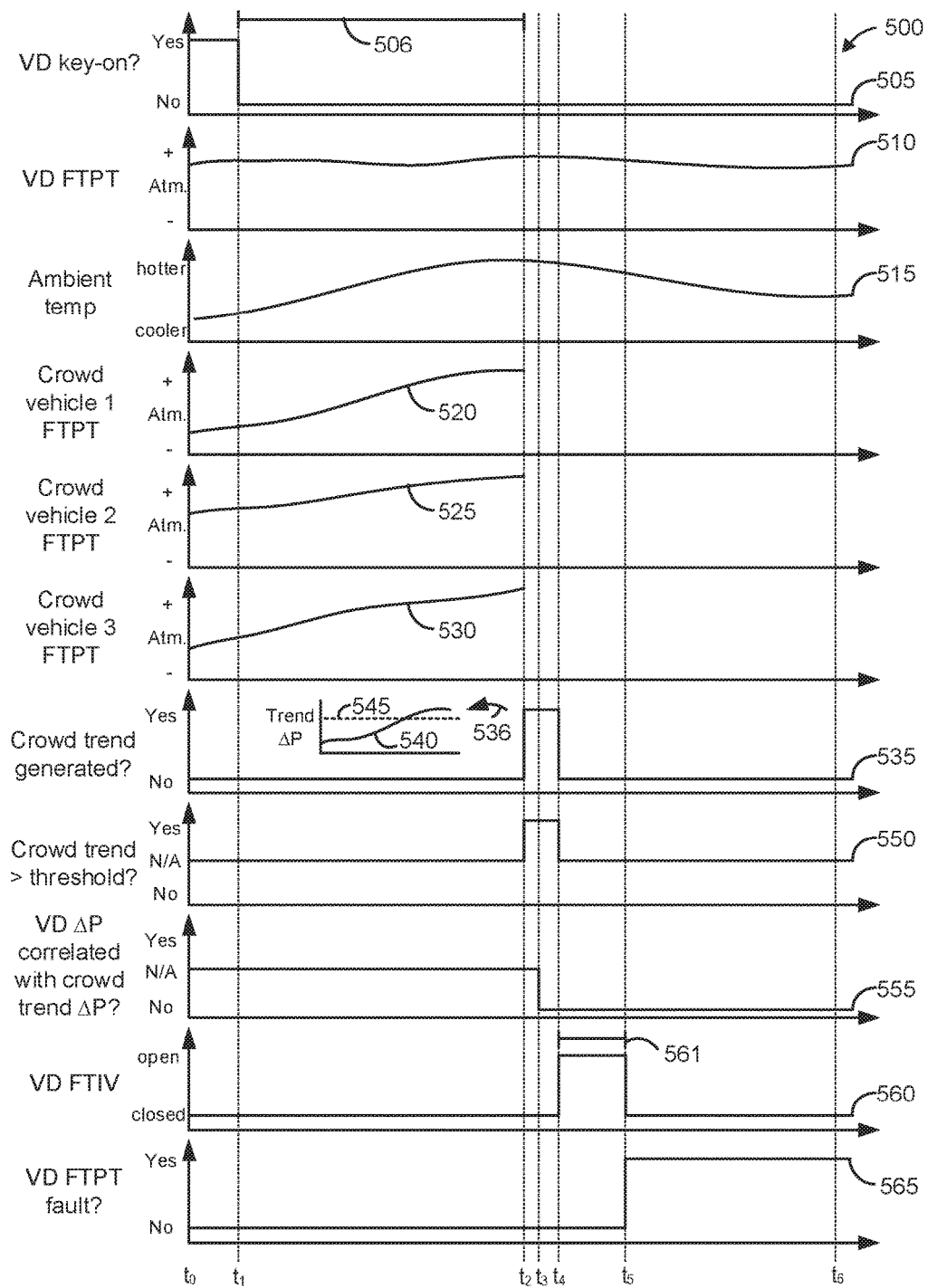
FIG. 5 depicts an example timeline for conducting a fuel tank pressure transducer rationality test using V2V or V2I2V technology.

The following description relates to systems and methods for diagnosing a vehicle fuel tank pressure transducer (FTPT) using V2V or V2I2V technology. The vehicle-to-be-diagnosed (VD), may comprise a vehicle capable of V2V technology, such as the hybrid vehicle system depicted in FIG. 1. Vehicles with a hybrid propulsion system, such as the propulsion system depicted in FIG. 1, may comprise a rechargeable battery which supplies power to an electric motor as well as an internal combustion engine which operates on a combustible fuel source. In order to reduce evaporative emissions, the vehicle fuel tank may be sealed with an isolation valve during non-refueling conditions to prevent overloading of the fuel vapor canister. Such a fuel system and evaporative emission system is depicted in FIG. 2, and may be referred to as a non-integrated refueling canister only system (NIRCOS). A fuel tank pressure transducer (FTPT) may be included in the fuel system, and may be used to indicate undesired evaporative emissions stemming from the fuel system and/or evaporative emissions system, and may also be utilized during refueling events to indicate that the fuel tank is depressurized prior to enabling fuel to be added to the tank. Accordingly, the FTPT may be periodically diagnosed/rationalized for whether the FTPT is functioning as desired. However, FTPT rationalization may be challenging due to the fact that the FTIV seals the fuel tank. One example for FTPT rationalization may involve commanding open the FTIV and thus coupling the fuel tank to atmosphere where it may be determined whether the FTPT registers atmospheric pressure after a predetermined duration. However, commanding open the FTIV may undesirably load the fuel vapor canister with fuel vapors. As such, systems and methods described herein may enable VD FTPT rationality with the fuel tank sealed. Such a system is depicted in FIG. 3, and may comprise the use of vehicle-to-vehicle (V2V) or vehicle-to-infrastructure-to-vehicle (V2I2V) technology for generating a select crowd of vehicles, where FTPT data from the select crowd may be compared to FTPT data from the VD in order to determine whether the VD FTPT is functioning as desired. Such a method for using V2V or V2I2V technology for VD FTPT rationalization is depicted in FIG. 4. An example timeline for V2V or V2I2V-technology based FTPT rationalization, using the method illustrated in FIG. 4, is depicted in FIG. 5.

Figure 1:
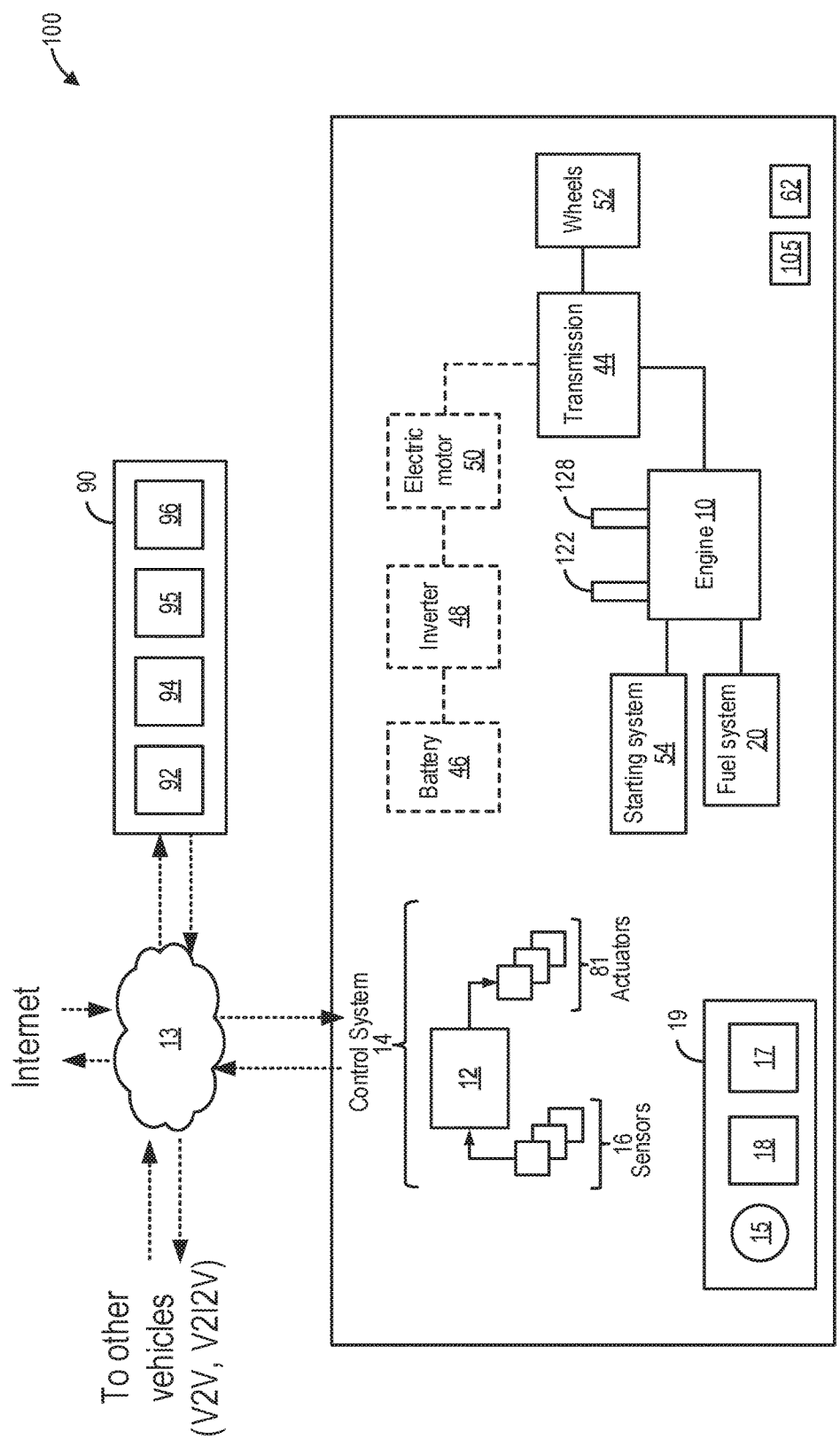
FIG. 1 shows a high-level block diagram illustrating an example vehicle system.

FIG. 1 depicts a vehicle system 100 including an internal combustion engine 10 coupled to transmission 44. Engine 10 may be started with an engine starting system 54, including a starter motor. Transmission 44 may be a manual transmission, automatic transmission, or combinations thereof. Transmission 44 may include various components including but not limited to a torque converter, a final drive unit, a gear set having a plurality of gears, and so on. Transmission 44 is shown coupled to drive wheels 52, which may contact a road surface.

In one embodiment, vehicle system 100 may be a hybrid vehicle wherein transmission 44 may alternatively be driven by an electric motor 50. For example, the motor may be a battery-powered electric motor (as depicted) wherein electric motor 50 is powered by energy stored in battery 46. Other energy storage devices that may be used to power motor 50 include a capacitor, a flywheel, a pressure vessel, and so on. An energy conversion device, herein inverter 48, may be configured to convert the DC output of battery 46 into an AC output for use by electric motor 50. Electric motor 50 may also be operated in a regenerative mode, that is, as a generator, to absorb energy from vehicle motion and/or the engine and convert the absorbed energy to an energy form suitable for storage in battery 46. Furthermore, electric motor 50 may be operated as a motor or generator, as required, to augment or absorb torque during a transition of engine 10 between different combustion modes (e.g., during transitions between a spark ignition mode and a compression ignition mode).

Battery 46 may periodically receive electrical energy from a power source residing external to the vehicle (e.g., not part of the vehicle). As a non-limiting example, vehicle propulsion system 100 may be configured as a plug-in hybrid electric vehicle (PHEV), whereby electrical energy may be supplied to battery 46 from a power source (not shown) via an electrical energy transmission cable (not shown) coupled to a charging port at the vehicle exterior. While the vehicle propulsion system is operated to propel the vehicle, electrical transmission cable may disconnected between power source and battery 46. Control system 14 may identify and/or control the amount of electrical energy stored at the battery, which may be referred to as the state of charge (SOC).

In other embodiments, physical connection between the power source and the vehicle via an electrical transmission cable may be omitted, whereby electrical energy may be received wirelessly (e.g. inductive charging) at battery 46 from external power source (not shown).

When configured in the hybrid embodiment, vehicle system 100 may be operated in various modes wherein the vehicle is driven by only the engine, only the electric motor, or a combination thereof. Alternatively, assist or mild hybrid modes may also be employed, wherein the engine 10 is the primary source of torque, and the electric motor 50 selectively adds torque during specific conditions, such as during a tip-in event. For example, during an "engine-on" mode, engine 10 may be operated and used as the primary source of torque for powering wheels 52. During the "engine-on" mode, fuel may be supplied to engine 10 from fuel system 20 including a fuel tank. The fuel tank may hold a plurality of fuels, such as gasoline, or fuel blends, such as a fuel with a range of alcohol (e.g., ethanol) concentrations including E10, E85, and so on, and combinations thereof. In another example, during an "engine-off" mode, electric motor 50 may be operated to power the wheels 52. The "engine-off" mode may be employed during braking, low speeds, while stopped at traffic lights, and so on. In still another example, during an "assist" mode, an alternate torque source may supplement and act in cooperation with the torque provided by engine 10.

Vehicle system 100 may further include control system 14. Control system 14 is shown receiving information from a plurality of sensors 16 and sending control signals to a plurality of actuators 81. The control system 14 may further include a controller 12. The controller 12 may receive input data from the various sensors 16 or buttons, process the input data, and trigger the actuators 81 in response to the processed input data based on instructions or code programmed therein corresponding to one or more routines. Example control routines are described herein with regard to FIG. 4.

The control system 14 may be communicatively coupled to an off-board remote computing device 90 via a wireless network 13, which may comprise Wi-Fi, Bluetooth, a type of cellular service, a wireless data transfer protocol, and so on.

The remote computing device 90 may comprise, for example, a processor 92 for executing instructions, a memory 94 for storing said instructions, a user interface 95 for enabling user input (e.g., a keyboard, a touch screen, a mouse, a microphone, a camera, etc.), and a display 96 for displaying graphical information. As such, the remote computing device 90 may comprise any suitable computing device, such as a personal computer (e.g., a desktop computer, a laptop, a tablet, etc.), a smart device (e.g., a smart phone, etc.), and so on. As described further herein, control system 14 may be further communicatively coupled to other vehicles or infrastructures using appropriate communications technology, as is known in the art. For example, control system 14 may broadcast (and receive) information regarding vehicle data, vehicle diagnostics, traffic conditions, etc. via vehicle-to-vehicle (V2V) or vehicle-to-infrastructure-to-vehicle (V2I2V) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. As such, communications between vehicles can be achieved without the need for an intermediate step. In still other examples, vehicle control system 14 may be communicatively coupled to other vehicles or infrastructures via a wireless network 13 and the internet (e.g. cloud), as is commonly known in the art. As will be described in further detail below, data communication between vehicles may enable vehicle diagnostics based on crowd information. In one example, a vehicle sensor may be indicated to be not functioning as desired responsive to said vehicle sensor operating differently than the respective vehicle sensor in other vehicles in the crowd.

Vehicle system 100 may also include an on-board navigation system 17 (for example, a Global Positioning System) on dashboard 19 that an operator of the vehicle may interact with. The navigation system 17 may include one or more location sensors for assisting in estimating vehicle speed, vehicle altitude, vehicle position/location, etc. This information may be used to infer engine operating parameters, such as local barometric pressure. Control system 14 may further be configured to receive information via the internet or other communication networks. Information received from the GPS may be cross-referenced to information available via the internet to determine local weather conditions, local vehicle regulations, etc. Control system 214 may use the internet to obtain updated software modules which may be stored in non-transitory memory. In another example, information on ambient temperature may be obtained via an ambient temperature/humidity sensor 62. In still further examples, one or more onboard cameras 105 may be included in the vehicle system 100, and may be configured to recognize particular objects and conditions that may influence current conditions with regard to vehicle system 100. For example, the one or more onboard cameras may be configured to indicate proximity to a house, garage, or other structure that may shield the vehicle from sunlight, thus potentially affecting the temperature seen by the vehicle system.

Dashboard 19 may further include a display system 18 configured to display information to the vehicle operator. Display system 18 may comprise, as a non-limiting example, a touchscreen display which enables the vehicle operator to view graphical information as well as input commands.

Dashboard 19 may further include an operator ignition interface 15 via which the vehicle operator may adjust the ignition status of the vehicle engine 10. Specifically, the operator ignition interface 15 may be configured to initiate and/or terminate operation of the vehicle engine 10 based on an operator input. Various embodiments of the operator ignition interface 15 may include interfaces that require a physical apparatus, such as an active key, that may be inserted into the operator ignition interface 15 to start the engine 10 and turn on the vehicle, or may be removed to shut down the engine 10 and turn off the vehicle. Other embodiments may include a passive key that is communicatively coupled to the operator ignition interface 15. The passive key may be configured as an electronic key fob or a smart key that does not have to be inserted or removed from the ignition interface 15 to operate the vehicle engine 10. Rather, the passive key may need to be located inside or proximate to the vehicle (e.g., within a threshold distance of the vehicle). Still other embodiments may additionally or optionally use a start/stop button that is manually pressed by the operator to start or shut down the engine 10 and turn the vehicle on or off. Based on the configuration of the operator ignition interface 15, a vehicle operator may provide an indication as to whether the engine 10 is in an engine-on or engine-off condition, and further whether the vehicle is in a vehicle-on or a vehicle-off condition.

Controller 12 may also receive an indication of the ignition status of engine 10 from an ignition sensor (not shown) coupled to the operator ignition interface 15. Control system 14 may be configured to send control signals to the actuators 81 based on input received from the sensors and the vehicle operator. The various actuators may include, for example, cylinder fuel injectors, an air intake throttle coupled to the engine intake manifold, a spark plug, and so on.

FIG. 2 shows a schematic depiction of a vehicle system 206. The vehicle system 206 includes an engine system 208 coupled to an evaporative emissions control (Evap) system 251 and a fuel system 218. Evap system 251 includes a fuel vapor container or canister 222 which may be used to capture and store fuel vapors. In some examples, vehicle system 206 may be a hybrid electric vehicle (HEV) system or a plug-in hybrid electric vehicle system (PHEV).

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more exhaust catalyst 270, which may be mounted in a close-coupled position in the exhaust. Exhaust catalyst may include a temperature sensor 279. In some examples one or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 224 may be placed in the intake manifold of engine 210 to adsorb fuel vapors emanating from unburned fuel in the intake manifold, puddled fuel from leaky injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 210 is shut down.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed Evap system 251, which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Evap system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations, "running loss" (that is, fuel vaporized during vehicle operation), and diurnal cycles. In one example, the adsorbent used is activated charcoal. Evap system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve (CVV) 297 coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Undesired vapor emissions detection routines may be intermittently performed by controller 212 on fuel system 218 and Evap system 251 to confirm that the fuel system 218 and Evap system 251 are not emitting undesired evaporative emissions. As such, evaporative emissions testing may be performed while the engine is off (engine-off test) using engine-off natural vacuum (EONV) generated due to a change in temperature and pressure at the fuel tank following engine shutdown. For example, responsive to an engine-off event, a fuel system may be isolated and the pressure in the fuel system may be monitored. Identification of undesired vapor emissions may be indicated based on a pressure rise below a threshold, or a rate of pressure rise below a threshold rate. Furthermore, as the fuel tank cools down, vacuum generation may be monitored and undesired vapor emissions identified based on development of a vacuum below a threshold, or a rate of vacuum development below a threshold rate.

In alternate examples, evaporative emissions testing routines may be performed while the engine is running by using engine intake manifold vacuum, or while the engine is either running or during engine-off conditions by operating a vacuum pump. For example, undesired evaporative emissions tests may be performed by an evaporative emissions check module (not shown) communicatively coupled to controller 212. An evaporative emissions check module may be coupled in vent 227, for example, between canister 222 and the atmosphere. An evaporative emissions check module may include a vacuum pump for applying negative pressure to the fuel system when administering an evaporative emissions test. In some embodiments, the vacuum pump may be configured to be reversible. In other words, the vacuum pump may be configured to apply either a negative pressure or a positive pressure on the fuel system.

In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and in some cases while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be a default open valve that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291 (fuel tank pressure transducer), mass air flow (MAF) sensor 282, barometric pressure sensor 213, fuel tank temperature sensor 288, and canister temperature sensor 232. Other sensors such as pressure, temperature, air/fuel ratio, and composition sensors may be coupled to various locations in the vehicle system 206. As another example, the actuators may include fuel injector 266, throttle 262, fuel tank isolation valve 252, CPV 261 and refueling lock 245. The controller 212 may receive input data from the various sensors, process the input data, and trigger the actuators in response to the processed input data based on instruction or code programmed therein corresponding to one or more routines. Example control routines are described herein with regard to FIG. 4. In addition, controller 12 may receive data from a navigation device 239 (such as GPS) and/or a V2X network including a V2V network (vehicle-to-vehicle), or a V2I network (vehicle to infrastructure), or a V2I2V (vehicle-to-infrastructure-to-vehicle) such as network 13 as discussed above with regard to FIG. 1. For example, a wireless communication device 280 may be coupled to the vehicle controller(s) 212, for enabling wireless communication.

In some examples, the controller may be placed in a reduced power mode or sleep mode, wherein the controller maintains essential functions only, and operates with lower battery consumption than in a corresponding awake mode. For example, the controller may be placed in a sleep mode following a vehicle-off event in order to perform a diagnostic routine at a duration following the vehicle-off event. The controller may have a wake input that allows the controller to be returned to an awake mode based on an input received from one or more sensors.

For PHEVs, the controller may be operated in a plugged-in mode while the vehicle is coupled to an external power source. For example, the controller may operate on power derived from the external power source, and not operate on power derived from an on-board energy storage device. A partial reduced power mode may be employed during a plugged-in mode, allowing for some controller functions outside of designated essential functions. Similarly, the controller may be operated in an inductive charging mode while the vehicle is inductively coupled to an external power source. In some embodiments, a state of battery charge during an inductive charging operation may trigger a return to an awake mode such that a method stored in the controller may be executed in order to decouple the magnetic field from the fuel tank. If the vehicle remains electrically coupled to an external power source following achievement of a fully charged energy storage device, the controller may be operated in a pre-ignition mode, wherein non-essential vehicle functions are performed using energy from the external power source in anticipation of a vehicle and/or engine start-up event.

As discussed above, in some examples a fuel tank may need to be depressurized prior to a refueling event. In other examples, including detection routines for undesired evaporative emissions, pressure in the fuel system 218 and/or evaporative emissions system 251 may be monitored as described above in order to indicate the presence or absence of undesired evaporative emissions. In such examples, FTPT 291 may be utilized to indicate pressure in the fuel system 218 and/or evaporative emissions system 251. In cases where FTPT 291 is not functioning as desired, operations such as test diagnostics for undesired emissions and fuel tank depressurization routines may not function properly. For example, an FTPT 291 that is stuck in a high range may not allow refueling to commence, due to the fact that the FTPT indicates that the fuel tank is still pressurized even though the tank may be sufficiently depressurized. In another example, if the FTPT 291 is stuck in a low range, then refueling may be allowed to commence prematurely (e.g., before the fuel tank is sufficiently depressurized). Accordingly, it is important to properly diagnose whether the FTPT 291 is functioning as desired. However, as discussed above, diagnosing proper operation of the FTPT 291 is complicated in vehicles with sealed fuel tanks (e.g., PHEVs), as a result of the fuel tank not being vented to atmosphere during lengthy vehicle-off soaks, where the FTPT is expected to indicate a value within a threshold of atmospheric pressure. Furthermore, any venting of the tank in order to assess functionality of the FTPT may result in further loading of the fuel vapor canister with vapors from the fuel tank, which is particularly undesirable for vehicles such as HEVs and PHEVs, where opportunities for fuel vapor canister purging may be limited. Other examples of assessing functionality of the FTPT, as discussed above, including the use of an onboard pump, may similarly load the fuel vapor canister undesirably, and add additional costs and complexity to the engine system. As such, for vehicles with sealed fuel tanks, an alternate methodology for diagnosing functionality of the FTPT is discussed herein that does not involve venting the fuel tank or the use of an onboard pump in order to assess FTPT function. Such a system and method is briefly illustrated herein with regard to FIG. 3, and in detail with regard to the methods of FIG. 4.

Turning now to FIG. 3, an example illustration 300 for a system and method is depicted detailing diagnosing a vehicle FTPT based on crowd information. For example, the inventors herein have recognized that it may be desirable to utilize crowd information from a number of vehicles in order to establish whether a particular vehicle's FTPT (e.g., 291) is not functioning as desired. As such, FTPT functionality may be diagnosed without venting the fuel tank, and without the use of onboard pumps. Such crowd information may comprise one or more of a vehicle-to-vehicle (V2V) network, a vehicle-to-infrastructure-to-vehicle (V2I2V) network, for example. Accordingly, FIG. 3 shows a vehicle 310 that is to be diagnosed for whether its FTPT is functioning as desired, in wireless communication 312 with a number of other vehicles 315 (e.g., V2V). FIG. 3 accordingly also illustrates vehicle 310 in wireless communication 312 with the number of other vehicles 315 via a wireless communication infrastructure 330 (e.g., V2I2V). Each of the vehicles including vehicle 310, and vehicles 315 may each include a vehicle control system 314 that may further include a controller 312, as discussed above with regard to FIGS. 1-2. A wireless communication device 380 may be coupled to each of the vehicle controller(s) 312, for enabling wireless communication between vehicles 310 and 315. Furthermore, each of the vehicles including vehicle 310 and vehicles 315 may each include a navigation device 339 (e.g., GPS), where the navigation device(s) on each vehicle may be configured for receiving information via GPS satellites 323. However, it may be understood that the above-described vehicles 310 and 315 may in some examples not include a navigation device 339 without departing from the scope of the present disclosure. Data from navigation device(s) (e.g., 339) in each vehicle (e.g., 310, 315) may be communicated to the respective controllers (e.g., 312) in each vehicle. As such, vehicle speed, vehicle altitude, vehicle position/location for each of the vehicles (e.g., 310, 315) may be obtained, and communicated to the respective controllers (e.g., 312) in each vehicle. Such data received from the navigation device(s) may in some examples be further cross-referenced to information available via the internet to determine local weather conditions, etc.

Control system 314 in each of the vehicles (e.g., 310, 315) is shown receiving information from a plurality of sensors 316 and sending control signals to a plurality of actuators 318. As one example, sensors 316 may include barometric pressure sensor (e.g., 213), mass air flow sensor (e.g., 282), fuel vapor canister temperature sensor (e.g., 232), exhaust gas sensor (e.g., 237), exhaust catalyst temperature sensor (e.g., 279), FTPT (e.g., 291), fuel tank temperature sensor (e.g., 288), and ambient temperature/humidity sensor (e.g., 62). Based on the sensors in each of the vehicles (e.g., 310 and 315), various information may be indicated, such as whether the vehicle is in operation, an estimate of time since the vehicle was last operating, ambient temperature/humidity near the vehicle(s), pressure in the fuel tank, etc. Furthermore, onboard cameras (e.g., 105) may be additionally utilized in order to indicate whether the vehicle is operating, conditions in which the vehicle is parked in (e.g., shade, direct sunlight, etc.), vehicle location, etc.

Vehicle 310 may retrieve information wirelessly via V2V or V2I2V technology from vehicles 315 within a predetermined distance 320 from vehicle 310. For example, vehicles 327 (where vehicles 327 are a subset of vehicles 315) may be excluded from having information retrieved from those vehicles, as they are outside of the predetermined distance 320 from vehicle 310. The predetermined distance may in some examples be set such that the vehicles from which information/data is to be retrieved are likely to be experiencing a very similar ambient temperature/humidity, and very similar weather as the vehicle to be diagnosed (e.g., 310).

Of the vehicles within the predetermined distance 320 from the vehicle to be diagnosed 310, it may be further determined which vehicles to utilize information/data from. In other words, of the vehicles within the predetermined distance 320 from the vehicle to be diagnosed 310, only a subset of those vehicles may make up a select "crowd" 324, that information/data will be obtained from and utilized in order to conduct a diagnostic for whether the FTPT in vehicle 310 is operating as desired. The details of what may constitute such a select crowd 324 will be elaborated in detail below with regard to the method illustrated in FIG. 4. Briefly, selection criteria for the crowd 324 may be based on vehicle make/model, whether a vehicle's fuel tank comprises a sealed fuel tank, fuel level, proximity to structures that may affect temperature/ambient conditions experienced by the vehicle, whether the vehicle is in a key-off condition, time since key-off, fuel tank pressure, fuel tank temperature, engine run-time prior to a key-off event, etc. As such, vehicles within the predetermined distance 320 that are not identified as making up the select crowd 324 may be termed excluded vehicles 329.

Subsequent to identification of the select crowd 324, information/data comprising each of the vehicles' (e.g., 310 and 315) FTPT (e.g., 291) may be obtained, for example, via V2V or V2I2V technology, as discussed above. In one example, FTPT data comprising a predetermined time frame prior to commencing the diagnostic may be obtained from each of the vehicles (e.g., 310 and 315). More specifically, it may be understood that, for vehicles with sealed fuel tanks, temperature fluctuations throughout a 24-hour period (e.g., diurnal cycle) may result in pressure/temperature changes within such sealed fuel tanks. As such, by retrieving data from each of the vehicles' (e.g., 310, 315) FTPT over a predetermined time frame, a pattern of FTPT movement (e.g., direction and magnitude) may be obtained. For example, of the select crowd 324, it may be determined that over the course of the predetermined time frame, the general trend is that fuel tank pressure increased by a determined amount. In another example, of the select crowd 324, it may be determined that over the course of the predetermined time frame, the general trend is that fuel tank pressure decreased by a determined amount. In still other examples, it may be determined that over the course of the predetermined time frame, the general trend is that fuel tank pressure did not change significantly. Such information on the direction and magnitude of pressure changes indicated in each of the vehicles in the select crowd 324 may next be compared to data obtained on the FTPT sensor over the same predetermined time frame for the vehicle to be diagnosed 310. If FTPT movement in the vehicle to be diagnosed 310 correlates with the FTPT movement obtained from the select crowd 324, it may be determined that the FTPT is functioning as desired. However, if FTPT movement in the vehicle to be diagnosed 310 does not correlate with the FTPT movement obtained from the select crowd 324, it may be determined whether one or more noise factors may be contributing to the FTPT in the vehicle to be diagnosed 310 not correlating with the FTPT movement obtained from select crowd 324. In other words, data obtained from the select crowd 324 and from the vehicle to be diagnosed 310 may be filtered to indicate whether confounding noise factors are contributing to the FTPT movement in the vehicle to be diagnosed 310 not correlating with the FTPT movement obtained from select crowd 324. Such filtering will be discussed in further detail below with regard to the method depicted in FIG. 4.

It may be understood that the methodology depicted above with regard to FIG. 3 may be applicable to vehicles that are in a key-off state, and not being propelled via either an on-board energy storage device such as a battery, or by a vehicle engine. For example, if the vehicle is in operation, even if the engine is not being operated, driving conditions may result in significant fuel slosh events in the fuel tank which may contribute to pressure changes as indicated by the FTPT. Such pressure changes based on driving conditions may contribute significantly to adding noise factors to any analysis of crowd-based FTPT sensor rationality, thus rendering such an approach susceptible to error. As such, it may be understood that the methodology described herein relates to vehicles in a keyed-off state, and not to vehicles in operation.

As such, the general methodology depicted in FIG. 3 constitutes a high-level example illustration for how an FTPT sensor may be rationalized in a vehicle to be diagnosed, based on crowd information obtained via V2V or V2I2V technology.

Turning now to FIG. 4, a flow chart for a high level example method 400 for performing an FTPT rationalization diagnostic procedure on a vehicle to be diagnosed, is shown. More specifically, method 400 may be used to select a crowd of vehicles within a predetermined distance from the vehicle to be diagnosed, whereby information regarding direction and magnitude of FTPT sensor movement from the vehicles in the select crowd may be correlated with information regarding direction and magnitude of FTPT sensor movement in the vehicle to be diagnosed. The select crowd may constitute vehicles where FTPT movement would be expected to be similar to FTPT movement in the vehicle to be diagnosed, based on a number of factors that may influence FTPT sensor movement, as discussed above with regard to FIG. 3, and in detail below with regard to method 400. In such an example, the select crowd and the vehicle to be diagnosed may include fuel tanks which are typically sealed except for during refueling events, otherwise known as non-integrated refueling only canister systems (NIRCOS). In this way, by correlating FTPT movement in a select crowd of vehicles with FTPT movement in a vehicle to be diagnosed, the FTPT sensor in the vehicle to be diagnosed may be rationalized without unsealing the fuel tank, and without the use of an additional onboard pump. As such, by diagnosing the FTPT without unsealing the tank in either the vehicle to be diagnosed or the vehicles that make up the select crowd, opportunities for undesired loading of fuel vapor canister(s) in said vehicles may be reduced. Furthermore, by diagnosing the FTPT sensor without the use of an onboard pump, costs and complexity of the fuel system and evaporative emissions system may be reduced. Method 400 will be described with reference to the systems described herein and shown in FIGS. 1-3, though it should be understood that similar methods may be applied to other systems without departing from the scope of this disclosure. Method 400 may be carried out by a controller, such as controller 312 in FIG. 3. Instructions for carrying out method 400 and the rest of the methods included herein may be executed by the controller based on instructions stored on a memory of the controller and in conjunction with signals received from sensors of the engine system, such as the sensors described above with reference to FIGS. 1-3. The controller may employ fuel system and evaporative emissions system actuators, such as canister purge valve (e.g., 61), canister vent valve (e.g., 297), fuel tank isolation valve (e.g., 252), etc., according to the method below.

Method 400 begins at 405 and includes evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. Proceeding to 410, method 400 may include indicating whether a vehicle to be diagnosed (VD) for FTPT (e.g., 291) functionality has been in a key-off condition for greater than a threshold duration, or if an indicated VD pressure change (ΔFTPT) is greater than a threshold. In one example, the threshold duration may comprise a predetermined duration of time, where the predetermined duration of time is based on a duration of time where a fuel tank pressure is likely to change significantly. Such an example time duration may be based on diurnal temperature changes, for example. In an example, the threshold duration may comprise 4 hours, however in other examples the threshold duration may comprise greater than, or less than 4 hours. For example, different threshold durations may be related to geographical diurnal temperature fluctuations. In another example, pressure in a fuel tank may change more rapidly than would be expected based on diurnal temperature changes, due to weather-related conditions such as rain, wind, snow, heavy cloud cover, etc. In such an example, a VD pressure change greater than a threshold may trigger method 400 to proceed to 425 (discussed below). In still further examples, a VD pressure change greater than a threshold may be due to a faulty FTPT "drifting" in one direction or another. Such a drift direction (and magnitude) may in some examples be unlikely to correspond to an expected pressure change, and thus may indicate that the VD FTPT is not functioning as desired, as will be discussed further below.

If, at 410 a time since key-off is not indicated to have reached the threshold duration, or an indicated pressure change in the fuel tank is not indicated to have reached the threshold pressure change, method 400 may proceed to 415, and may include indicating whether a key-on event is detected. If a key-on event is detected, indicating that the vehicle is being operated, method 400 may proceed to 417. At 417, method 400 may include aborting the method, and may include setting a flag at the controller that the FTPT diagnostic procedure was not completed, and may further include scheduling the FTPT diagnostic procedure to be retried at the next key-off event. Method 400 may then end.

Returning to 415, if a key-on event is not detected, method 400 may proceed to 420. At 420, method 400 may include maintaining current engine, evaporative emission system, and fuel system status. For example, the engine may be maintained off, and the fuel tank may be maintained sealed via a fuel tank isolation valve (e.g., 252). Furthermore, the evaporative emissions system settings may be maintained, for example a canister purge valve (e.g., 261) may be maintained closed, and a canister vent valve (e.g., 297) may be maintained in its current position (e.g., open or closed). Method 400 may then return to 410, where it may be further indicated whether VD time since key-off has subsequently reached the threshold duration, or if pressure in the fuel tank (VD pressure change) has reached the threshold pressure change.

If, at 410, it is indicated that VD time since key-off has reached the threshold duration, or if it is indicated that VD pressure change has reached the threshold pressure change, method 400 may proceed to 425. It may be understood that in some examples, an indicated pressure change in the fuel tank greater than the threshold may itself indicate that the FTPT (e.g., 291) is functioning as desired. However, as discussed above a pressure change greater than a threshold may alternatively be indicative of a "drifting" FTPT. In addition, while in some examples a pressure change greater than a threshold may be indicative that the FTPT is functioning as desired, an FTPT change may additionally or alternatively indicate undesired evaporative emissions may be escaping, and thus resulting in the indicated FTPT change. While such an example may rely on a functioning FTPT, it may beneficial to diagnose potential undesired evaporative emissions, as will be described in further detail below. As such, while in some examples an FTPT change greater than a threshold during a key-off condition may be utilized to infer that the FTPT is functioning as desired, method 400 instead may be used to correlate any FTPT movement with crowd data, in order to ascribe FTPT movement (direction and magnitude) to expected pressure changes in the VD fuel tank. As such, an indication at 410 that VD FTPT change is greater than a threshold may enable method 400 to proceed to 425, and may not be utilized to indicate a functioning FTPT. However, it may be understood that in some examples, another method may be utilized for the same vehicle wherein an FTPT change greater than a threshold during a key-off event may be used to indicate that the FTPT is functioning as desired. Such an example may include correlating FTPT change with ambient temperature/weather fluctuations, for example.

Continuing on, as discussed above, if VD time since key-off is greater than a threshold duration or if VD FTPT change is greater than a threshold, method 400 may proceed to 425. At 425, method 400 includes generating a select crowd of vehicles from which to obtain data on the respective FTPT in each of the vehicles in the select crowd. As discussed above with regard to FIG. 3, generating the select crowd may comprise the use of vehicle-to-vehicle (V2V) or vehicle-to-infrastructure-to-vehicle (V2I2V) technology. For example, the VD may retrieve information from a plurality of vehicles equipped with V2V or V2I2V technology. From the plurality of vehicles, a first subset of those vehicles within a predetermined distance (e.g., 320) of the VD may be selected as potential candidates for obtaining FTPT data from. In other words, selecting the first subset of vehicles within a predetermined distance may comprise a first filtering process of generating the select crowd. By limiting the potential crowd of vehicles to vehicles within the predetermined distance, method 400 may increase the likelihood that such vehicles are experiencing very similar ambient temperature/humidity and weather conditions. However, not all vehicles that are within the predetermined distance may be appropriate candidates for the select crowd. As such, from the vehicles indicated to be within the predetermined distance, method 400 may subsequently determine a second subset of vehicles for the select crowd. In other words, selecting the second subset of vehicles may comprise a second filtering process of generating the select crowd. For example, as discussed above with regard to FIG. 3, selection criteria for the select crowd may be based on vehicle make/model, whether a vehicle's fuel tank comprises a sealed fuel tank, fuel level, proximity to structures that may affect temperature/ambient conditions experienced by the vehicle, whether the vehicle is in a key-off state, time since key-of, fuel tank pressure, fuel tank temperature, engine run-time prior to a key-off event, etc. Any vehicles not meeting the selection criteria may be termed excluded vehicles (e.g., 329), as discussed above with regard to FIG. 3. As an example, the select crowd may comprise vehicles with a similar make/model, similar level of fuel in the tank as the VD, a key-off time of greater than or equal to VD key-off time, a sealed fuel tank, and temperature and pressure in the tank within a threshold to VD temperature and pressure at the time of key-off, etc. However, in some examples an indicated pressure and temperature of the vehicles in the select crowd may not be utilized as selection criteria, without departing from the scope of the present disclosure. As an example, consider a vehicle in which the pressure in the tank is relatively high at key off. If ambient temperature is high, pressure in the tank may still be expected to increase. Alternatively, if ambient temperature is low, pressure in the tank may be expected to decrease. As data on the direction and magnitude of the pressure change after key-off as indicated by a vehicle's FTPT is important for the FTPT rationality diagnostic discussed herein, precise levels of pressure and temperature in the tank of potential vehicles may not be a particularly relevant criteria. As such, in some examples a similar pressure and temperature in a potential vehicle to pressure and temperature of the VD may be used as a selection criteria, while in other examples similar pressure and temperature in a potential vehicle as that of the VD may not be used as selection criteria. Further selection criteria may include whether potential vehicles are parked in similar settings as the VD. For example, as discussed above, data from GPS and/or onboard cameras in potential vehicles may be utilized to indicate whether a potential vehicle may be parked in a setting that may influence, or impact, FTPT readings. For example, a potential vehicle that is parked in a climate controlled garage may be excluded from the select crowd. As another example, a potential vehicle that is parked in the shade (e.g., shielded via a large building or other structure) while the VD is parked in direct sunlight may be excluded from the select crowd. Along the same lines, if the VD is parked in the shade, potential vehicles parked in direct sunlight may be excluded from the select crowd. Other possible reasons that a potential vehicle may be excluded from the select crowd may comprise the potential vehicle experiencing weather conditions that the VD is not experiencing, such as rain, wind, etc. As such, at 425, method 400 may comprise retrieving information from a plurality of vehicles via V2V or V2I2V technology, from those vehicles determining a subset of those vehicles within a predetermined distance (e.g., 320) of the VD, and from the vehicles within the predetermined distance, generating a select crowd based on further selection criteria as discussed above. Accordingly, the FTPT (e.g., 291) in each of the vehicles comprising the select crowd are likely to indicate similar movement (direction and magnitude), as each other and as the VD, under conditions where the VD FTPT is functioning as desired.

Proceeding to 430, method 400 includes obtaining FTPT data from the vehicles comprising the select crowd. As discussed above, obtaining FTPT data from the vehicles comprising the select crowd may comprise V2V or V2I2V technology. As an example, FTPT data from each of the vehicles that comprise the select crowd may be communicated to a controller of the VD. In some examples, FTPT data from each of the vehicles that comprise the select crowd may include FTPT data spanning the duration that the VD was in a keyed-off condition. For example, even if one or more of the vehicles in the select crowd are indicated to have been in a keyed-off condition greater than the duration that the VD was in a keyed-off condition, only FTPT data comprising the duration of time the VD was in a keyed-off condition may be obtained from the one or more vehicles in the select crowd. However, in some examples, responsive to one or more of the vehicles in the select crowd indicated to have been in a keyed-off condition greater than the duration that the VD was in a keyed-off condition, FTPT data may be obtained for a duration greater than the duration that the VD was in a keyed-off condition. While the above examples illustrate two possibilities of how FTPT data may be obtained from the vehicles in the select crowd, other examples have been contemplated and the above-illustrated examples are not meant to be limiting in any way. For example, FTPT data from any of the vehicles comprising the select crowd may be communicated to the VD controller in any manner/fashion that enables an accurate indication of direction and magnitude of respective FTPT changes over a timeframe corresponding to the time the VD is indicated to be in a keyed-off condition.

Proceeding to 435, method 400 may include generating an FTPT-based pressure change trend based on the combined data from each of the vehicles that comprise the select crowd. For example, the VD controller may take each FTPT data set from each of the vehicles comprising the select crowd, and normalize each of the data sets to a baseline. With the data sets normalized to a baseline, a direction and magnitude of each of the FTPTs may be generated. Subsequent to generating a direction and magnitude comprising each of the vehicles' FTPT in the select crowd, all of the data may be averaged to obtain an overall trend for the direction and magnitude of FTPT change that may be expected for a vehicle (the VD in this example) in close proximity to the vehicles in the select crowd. The generated FTPT trend may include generating a standard deviation, or standard error based on the combined FTPT data from the vehicles in the select crowd. As such, with error measurements generated, such a data set may be effectively compared to FTPT data from the VD.

Accordingly, proceeding to 440, method 400 may include indicating whether the generated FTPT pressure change trend is greater than a threshold. For example, the threshold may comprise an FTPT change that is indicative of an induced pressure change based on changes in atmospheric/weather conditions, whereas an FTPT change (or absence thereof) less than the threshold may be indicative of minor fluctuations in pressure that are not indicative of an induced pressure change. If, at 440, it is indicated that the generated FTPT pressure change trend is not greater than the threshold, method 400 may proceed to 445. At 445, method 400 may include indicating whether the VD FTPT pressure change is correlated with the generated FTPT pressure change trend. For example, similar to that discussed above with regard to generating an average direction and magnitude pressure change for the vehicles in the select crowd, a direction and magnitude for the VD FTPT may be generated. If the direction and magnitude of the VD FTPT pressure change trend are similar (e.g., within error margins), method 400 may proceed to 450 and may include indicating that the diagnostic is inconclusive. For example, because the generated FTPT pressure change trend was below the threshold, and the VD FTPT change was indicated to be similar, a conclusive assessment of whether the VD FTPT is functioning as desired may not be possible. As an example, it may be that ambient conditions/weather fluctuations did not contribute to significant pressure changes as indicated by the FTPT in each of the VD and the vehicles comprising the select crowd. However, it may not be ruled out that one or more of the FTPTs in the select crowd are not functioning as desired, and/or that the VD FTPT is not functioning as desired. Accordingly, an inconclusive diagnostic test result may be recorded at the controller at 450. Proceeding to 460, method 400 may include setting a flag at the controller to schedule follow-up FTPT test diagnostics on the VD. In some examples, an inconclusive result may be additionally communicated to the other vehicles in the select crowd, wherein a flag may be set at the respective controllers in the select crowd indicating that a test diagnostic was conducted on a vehicle and that the diagnostic was inconclusive. Accordingly, a follow-up test may be additionally scheduled in the vehicles comprising the select crowd, in some examples. A follow up test for either or both of the VD and the vehicles comprising the select crowd may include a similar test based on V2V or V2I2V technology at a key-off event, or may comprise another test diagnostic that does not rely on V2V or V2I2V communication with other vehicles. Such other test diagnostics that do not rely on V2V or V2I2V are well known in the art, and any such method may be used without departing from the scope of this disclosure. Method 400 may then end.

Returning to 445, if the generated FTPT pressure change trend is not indicated to be greater than the threshold (at step 440), and VD FTPT pressure change is not correlated with the generated FTPT pressure change trend, method 400 may proceed to 455. At 455, method 400 may include indicating a potential for undesired evaporative emissions. For example, VD FTPT pressure change may be significantly greater than the generated FTPT pressure change trend. Furthermore, VD FTPT pressure change may in some examples be in an opposite direction than that of the generated FTPT pressure change trend. In such examples, it may be that the FTPT is functioning as desired, yet there may be a source of undesired emissions in the fuel tank resulting in the FTPT registering a significant pressure change. In another example, the FTPT may be faulty, where the sensor is drifting considerably over the duration that the vehicle is in a keyed-off state. In either case, at 455 a flag may be set at the controller indicating a potential fault. Proceeding to 460, method 400 may include scheduling follow-up tests to diagnose the indicated potential fault. For example, as discussed above, follow-up tests may include a similar FTPT test diagnostic based on V2V or V2I2V or may comprise another FTPT test diagnostic known in the art. In one example, a fuel tank isolation valve (e.g., 252) may be commanded open and the FTPT monitored. By commanding open the FTIV, if there is standing pressure or vacuum in the tank, a functional FTPT may register a response when the FTIV is commanded open. Such a response may thus indicate that the undesired evaporative emissions may be from the fuel tank.

Accordingly, in another example, one or more follow-up tests may be scheduled to test for undesired evaporative emissions from the fuel tank, as is known in the art. However, as these tests typically rely on a functional FTPT, such an indication of undesired emissions at 455 may additionally or alternatively comprise illuminating a malfunction indicator light (MIL) at 460 to signal the vehicle operator to have the vehicle serviced. For example, such an MIL may be illuminated on the vehicle dashboard. Method 400 may then end.

Returning to 440, if it is indicated that the generated FTPT pressure change trend is greater than the threshold, method 400 may proceed to 465. At 465, it may be determined whether the VD FTPT pressure change is correlated with the generated FTPT pressure change trend. If the VD FTPT pressure change is indicated to be correlated (direction and magnitude) with the generated FTPT pressure change trend (e.g., within error margins), method 400 may proceed to 470. Accordingly, at 470, method 400 may include indicating that the VD FTPT is functioning as desired. As such, no diagnostic trouble code (DTC) or MIL may be set, and method 400 may then end.

Alternatively, at 465 if it is indicated that the generated FTPT pressure change trend is greater than the threshold (at 440) and if it is further indicated at 465 that the VD FTPT pressure change is not correlated with the generated FTPT pressure change trend, method 400 may proceed to 475. At 475, method 400 may include indicating that the VD FTPT is not functioning as desired, or some other fault, as discussed above with regard to step 455. For example, if the VD FTPT is not indicated to have moved during the course of the key-off event, it may be indicated that it is likely that the VD FTPT is not functioning as desired. In another example, where the direction and magnitude of VD FTPT change is different than that of the generated FTPT pressure change trend, it may be indicated that it is likely there is a source of undesired emissions stemming from the fuel tank. As such, at 475 a fault may be indicated and a flag may be set at the controller. Proceeding to 480, method 400 may include scheduling follow-up tests to diagnose the indicated potential fault, as discussed above with regard to step 460 of method 400. For example, follow-up tests may include a similar FTPT test diagnostic based on V2V or V2I2V or may comprise another FTPT test diagnostic known in the art. In one example, a fuel tank isolation valve (e.g., 252) may be commanded open and the FTPT monitored. As discussed above, by commanding open the FTIV, if there is standing pressure or vacuum in the tank, a functional FTPT may register a response when the FTIV is commanded open. Such a response may thus indicate that the undesired evaporative emissions may be from the fuel system. Accordingly, in another example, one or more follow-up tests may be scheduled as is known in the art. However, as these tests typically rely on a functional FTPT, such an indication of undesired evaporative emissions at 475 may additionally or alternatively comprise illuminating a malfunction indicator light (MIL) at 480 to signal the vehicle operator to have the vehicle serviced. For example, such an MIL may be illuminated on the vehicle dashboard. Method 400 may then end.

FIG. 5 depicts an example timeline 500 for performing an FTPT rationalization diagnostic procedure on a vehicle to be diagnosed (VD), wherein FTPT data from a select crowd of vehicles within a predetermined distance of the VD is used to infer whether a VD FTPT is functioning as desired, using the method described herein and with reference to FIG. 5. Timeline 500 includes plot 505, indicating whether the VD is in a key-on or a key-off condition, over time. Line 506 represents a threshold duration, the threshold duration comprising a predetermined time duration for which, during a key-off event, once the threshold duration has elapsed, the FTPT rationalization diagnostic procedure may commence. Timeline 500 further includes plot 510, indicating a level of pressure in the VD fuel tank, as monitored by a VD FTPT, over time. Timeline 500 further includes plot 515, indicating an ambient temperature, over time. While not explicitly illustrated, it may be understood that the ambient temperature may comprise an ambient temperature in the vicinity of the VD, as well as the vehicles in the select crowd, as will be discussed further below and as discussed above. Such an ambient temperature may be indicated by ambient temperature sensor(s) on the VD (e.g., 62) and may additionally be indicated by ambient temperature sensors on the vehicles comprising the select crowd. In another example, ambient temperature (and weather data) may be indicated via GPS navigation systems (e.g., 339), in either or both of the VD and/or one or more of the vehicles comprising the select crowd. Timeline 500 further includes plot 520, indicating a fuel tank pressure in a first vehicle comprising one of the vehicles in the select crowd, as monitored by a first vehicle FTPT, over time. Timeline 500 further includes plot 525, indicating a fuel tank pressure in a second vehicle comprising one of the vehicles in the select crowd, as monitored by a second vehicle FTPT, over time. Timeline 500 further includes plot 530, indicating a fuel tank pressure in a third vehicle comprising one of the vehicles in the select crowd, as monitored by a third vehicle FTPT, over time. Timeline 500 further includes plot 535, indicating whether a crowd-based FTPT pressure change trend has been generated, over time. Timeline 500 further includes inset 536, which includes plot 540, indicating the generated FTPT pressure change trend, based on FTPT data from vehicles comprising the select crowd, over time. Line 545 represents a threshold FTPT change which, if reached, may enable the generated FTPT pressure change trend to be compared to VD FTPT data in order to indicate whether the VD FTPT is functioning as desired. Accordingly, timeline 500 further includes plot 550, indicating whether the generated FTPT pressure change trend (crowd trend) is greater than a threshold. Timeline 500 further includes plot 555, indicating whether VD pressure change data as indicated by VD FTPT is correlated with the generated FTPT pressure change trend from the select crowd, over time. Timeline 500 further includes plot 560, indicating whether a fuel tank isolation valve (e.g., 252) in the VD is in an open or closed conformation, over time. Line 561 represents a predetermined threshold time duration for opening the FTIV, where if the FTIV is open for the threshold duration without a fuel tank pressure change as indicated by the VD FTPT, a fault may be indicated, as discussed in detail below. Accordingly, timeline 565 further includes plot 565, indicating whether a fault has been indicated in the VD, over time.

At time $t_0$, the VD is in operation, as indicated by plot 505. VD FTPT, as indicated by plot 510, is indicating that pressure in the VD fuel tank is slightly above atmospheric pressure. Ambient temperature is indicated to be in a cooler portion of the diurnal cycle, as illustrated by plot 515. Crowd vehicles 1, 2, and 3 are indicated to have varying levels of pressure in their respective fuel tanks, as indicated by plots 520, 525, and 530, respectively. While crowd vehicles 1, 2 and 3 are illustrated starting at time $t_0$, it may be understood that the depiction of the crowd vehicles is to illustrate how pressure may change in their respective fuel tanks, and not to imply that the crowd vehicles have been selected at time $t_0$. Instead, it may be understood that crowd vehicles are only selected responsive to the threshold duration, indicated by line 506, expiring. Furthermore, it may be understood that timeline 500 does not include vehicles that are excluded from the select crowd, to simplify the illustration.

Continuing on, at time $t_0$ a generated FTPT pressure change trend based on FTPT data from the select crowd in not indicated to have been generated, indicated by plot 535, as the VD is in a key-on condition. Accordingly, whether or not the generated FTPT pressure change trend is greater than a threshold is not applicable (N/A) at time $t_0$, as indicated by plot 550. Furthermore, whether VD fuel tank pressure change as indicated by the VD FTPT is correlated with the generated FTPT pressure change trend is also not applicable (N/A), as indicated by plot 555. As the VD comprises a NIRCOS fuel system, the FTIV is in a closed conformation, as indicated by plot 560, thus the VD fuel tank is sealed. Additionally, no fault is indicated, as indicated by plot 565.

At time $t_1$, the VD transitions from a key-on condition to a key-off condition. Accordingly, it may be understood that at time $t_1$ the VD is parked. As such, with the VD in a key-off condition, an FTPT rationalization diagnostic procedure may be conducted, responsive to either an indication that the VD FTPT has changed greater than a threshold amount, or if a threshold duration has elapsed, as discussed above with regard to step 410 or method 400. Accordingly, a key-off timer may increment at time $t_1$, where the threshold duration is represented by line 506.

Between time $t_1$ and $t_2$, while the VD is in a key-off condition, ambient temperature as indicated by plot 515 rises corresponding to the diurnal temperature cycle. Accordingly, for sealed fuel tanks, pressure may increase responsive to temperature increases. However, even though temperature is increasing between time $t_1$ and $t_2$, a corresponding pressure increase in the VD fuel tank as indicated by the VD FTPT is not indicated. Alternatively, other vehicles, for example crowd vehicles 1, 2, and 3 are all indicated to experience pressure increases in their respective fuel tanks, as indicated by FTPTs in each of their respective fuel tanks. As discussed above, the inclusion of FTPT data from crowd vehicles 1, 2, and 3 is meant to be illustrative, though it may be understood that between time $t_1$ and $t_2$ crowd vehicles have not yet been selected.

At time $t_2$, the threshold duration of time as indicated by plot 506 elapses. As such, the FTPT rationalization diagnostic procedure may commence. As discussed above, in some examples a change in VD FTPT greater than a threshold may enable the FTPT rationalization diagnostic procedure to commence, however in this example illustration VD FTPT is indicated to have remained steady during the predetermined time duration since the key-off event at time $t_1$. However, as the threshold time duration is reached at time $t_2$, the FTPT rationalization diagnostic procedure is initiated. Accordingly, as discussed above with regard to method 400, a select crowd of vehicles may be generated such that FTPT data from the select crowd may be obtained for the FTPT rationalization procedure. To generate the select crowd, vehicle-to-vehicle (V2V) or vehicle-to-infrastructure-to-vehicle (V2I2V) technology may be utilized to retrieve information from a plurality of vehicles equipped with such technology, and from the plurality of vehicles, a first subset of those vehicles within a predetermined distance (e.g., 320) of the VD may be selected as potential candidates for obtaining FTPT data from. In other words, selecting the subset of vehicles within a predetermined distance may comprise a first filtering process of generating the select crowd. As discussed above, by limiting the potential crowd of vehicles to vehicles within the predetermined distance increases the likelihood that such vehicles are all experiencing very similar ambient temperature/humidity and weather conditions. Next, from the first subset of vehicles within the predetermined distance, a second subset of vehicles may be selected as comprising the select crowd of vehicles. In other words, selecting the second subset of vehicles may comprise a second filtering process of generating the select crowd.

Selection criteria for the second subset of vehicles comprising the select crowd may include vehicle make/model, whether a vehicle's fuel tank comprises a sealed fuel tank, fuel level, proximity to structures that may affect temperature/ambient conditions experienced by the vehicle, whether the vehicle is in a key-off state, time since key-of, fuel tank pressure, fuel tank temperature, engine run-time prior to a key-off event, etc. Vehicles that are not included in the select crowd may be termed excluded vehicles, and as such, excluded vehicles are not illustrated in the example timeline 500. For example, the select crowd may comprise vehicles with a similar make/model, similar level of fuel in the tank as the VD, a key-off time of greater than or equal to VD key-off time, a sealed fuel tank, and temperature and pressure in the tank within a threshold to VD temperature and pressure at the time of key-off, etc. Further selection criteria may include whether potential vehicles are parked in similar settings as the VD. For example, as discussed above, data from GPS and/or onboard cameras in potential vehicles may be utilized to indicate whether a potential vehicle may be parked in a setting that may influence, or impact, FTPT readings. As such, the select crowd may comprise vehicles with sealed fuel tanks where the FTPT readings in each of the vehicles comprising the select crowd are likely to indicate similar movement (direction and magnitude), as each other and as the VD, under conditions where the VD FTPT is functioning as desired. It may be understood that the select crowd may comprise any number of vehicles within the predetermined distance (e.g., 320). For illustrative purposes, only three vehicles are indicated as making up the select crowd, referred to herein as crowd vehicle 1, crowd vehicle 2, and crowd vehicle 3. As such, it may be understood that the crowd vehicles comprising the select crowd are selected subsequent to the expiration of the predetermined threshold duration after key-off, and any vehicles excluded from the select crowd are not included in the example timeline 500.

Subsequent to generation of the select crowd, FTPT data from each of the vehicles comprising the select crowd may be obtained via V2V or V2I2V technology. For example, FTPT data from each of the vehicles in the select crowd may be communicated to the controller of the VD. FTPT data from the vehicles comprising the select crowd may be communicated to the VD controller in any manner/fashion that enables an accurate indication of direction and magnitude of respective FTPT changes over a timeframe corresponding to the time the VD is indicated to be in a keyed-off condition. From the FTPT data obtained from each vehicle in the select crowd, an overall trend for the direction and magnitude of FTPT change may be generated (e.g. an average), herein referred to as the generated FTPT trend. The generated FTPT trend may include generating a standard deviation, or standard error based on the combined FTPT data from the vehicles in the select crowd. As such, with error measurements generated, such a data set may be effectively compared to FTPT data from the VD. Accordingly, the generated FTPT trend 540 is illustrated by inset 536. With the FTPT trend generated, it may be determined whether the generated FTPT trend overall change is greater that a threshold illustrated by line 545. For example, the threshold may comprise an FTPT change that is indicative of an induced fuel tank pressure change based on changes in atmospheric/weather conditions, whereas an FTPT change (or absence thereof) less than the threshold may be indicative of minor fluctuations in fuel tank pressure that are not indicative of an induced fuel tank pressure change. In this example inset, the generated FTPT trend change 540 is greater than the threshold 545, and thus it is indicated that the trend change is greater than the threshold, as illustrated by plot 550.

With the FTPT trend 540 generated from the vehicles comprising the select crowd, it may be determined whether VD FTPT pressure change is correlated with the generated FTPT pressure change trend. Accordingly, at time $t_3$ it is indicated that the VD FTPT pressure change is not correlated with the generated FTPT pressure change trend, as illustrated by plot 555. In some examples, a VD FTPT pressure change that is not indicated to correlate with the generated FTPT pressure change trend may result in a flag being set at the controller (setting a diagnostic trouble code), and may include illuminating a malfunction indicator light (MIL). However, in other examples, a flag may not be set, and the MIL may not be illuminated until a follow-up test confirms a potential malfunctioning VD FTPT. As such, in this example timeline 500, although it is indicated at time $t_3$ that the VD FTPT pressure change is not correlated with the generated FTPT pressure change trend, a flag is not set, an a MIL is not illuminated (herein referred to as a fault), illustrated by plot 565. Instead, at time $t_4$, a VD fuel tank isolation valve (e.g., 252) may be commanded open, illustrated by plot 560. By commanding open the FTIV in the VD, any standing pressure or vacuum in the fuel tank may be relieved, thus resulting in a pressure change that may be monitored by the VD FTPT. Accordingly, between time $t_4$ and $t_5$, pressure in the VD fuel tank may be monitored via the VD FTPT. However, between time $t_4$ and $t_5$, even with the VD FTIV open, no pressure change is indicated by the VD FTPT, as illustrated by plot 510. Accordingly, at time $t_5$, a VD FTPT fault may be indicated, as illustrated by plot 565. As discussed above, a VD FTPT fault may be indicated by setting a flag at the controller (e.g., a diagnostic trouble code), and illuminating a MIL to alert the vehicle operator to have the vehicle serviced. As a fault is indicated at time $t_5$, the VD FTIV may be commanded closed in order to seal the VD fuel tank from atmosphere, to prevent any further loading of the VD fuel vapor canister during key-off conditions. As such, between time $t_5$ and $t_6$, the VD remains in a key-off state with the fuel tank sealed.

In this way, an FTPT rationalization procedure on a vehicle-to-be-diagnosed (VD) may be conducted based on FTPT data from a select crowd of vehicles. Such an FTPT rationalization procedure may include generating the select crowd based on a number of factors such that it is likely that the FTPTs in each of the vehicles in the select crowd register similar movement (e.g., direction and magnitude) as that of the VD. Accordingly, it may be determined whether the VD FTPT is functional based on a generated FTPT trend from FTPT data obtained from vehicles within the select crowd.

The technical effect is to recognize that V2V or V2I2V technology may be effectively utilized in order to obtain FTPT data from vehicles comprising the select crowd, where each of the vehicles include sealed fuel tanks and where each of the vehicles are likely to experience similar ambient/weather conditions. As such, FTPT data from the select crowd may comprise a robust data set that may allow an accurate assessment of whether the VD FTPT is functioning as desired. A further technical effect is that VD FTPT rationality via the use of V2V or V2I2V technology may enable the VD FTPT to be diagnosed without the need for commanding open a fuel tank isolation valve (FTIV). As discussed above, commanding open the FTIV in order to rationalize the FTPT sensor may undesirably load a fuel vapor canister with fuel vapors. For hybrid electric vehicles with limited engine run time, opportunities for cleaning out the fuel vapor canister may be limited, thus loading of the fuel vapor canister during FTPT rationalization tests may contribute to undesired evaporative emissions in some examples. As such, by conducting FTPT diagnostic procedures via the use of V2V or V2I2V technology, it may be determined whether the VD FTPT is functioning as desired, without loading the fuel vapor canister with fuel tank vapors, and may thus reduce undesired evaporative emissions.

The systems described herein and with reference to FIGS. 1-3, along with the methods described herein and with reference to FIG. 4, may enable one or more systems and one or more methods. In one example, a method comprises indicating fuel tank pressure changes from a fuel tank pressure transducer (FTPT) coupled to a fuel tank of a vehicle being diagnosed; receiving fuel tank pressure indications from a select crowd of vehicles; and conducting a rationality test of the FTPT by correlating the indicated fuel tank pressure changes from the vehicle being diagnosed with indicated fuel tank pressure changes from the select crowd of vehicles to diagnose functioning of the FTPT. In a first example of the method, the method further includes wherein conducting the FTPT rationality test on the vehicle being diagnosed commences responsive to one of at least a key-off condition in the vehicle being diagnosed greater than a predetermined threshold duration, or a fuel tank pressure change in the vehicle being diagnosed greater than a predetermined fuel tank pressure change threshold. A second example of the method optionally includes the first example and further includes wherein fuel tank pressure change in the vehicle being diagnosed is indicated by the FTPT in the vehicle being diagnosed; and wherein fuel tank pressure changes in the select crowd of vehicles is indicated by an FTPT in each of the vehicles comprising the select crowd of vehicles. A third example of the method optionally includes any one or more or each of the first and second examples and further includes wherein both the fuel tank in the vehicle being diagnosed and fuel tanks in the vehicles comprising the select crowd of vehicles comprise fuel tanks that are sealed except for during refueling events. A fourth example of the method optionally includes any one or more or each of the first through third examples and further comprises capturing and storing fuel tank vapors in a fuel vapor canister which is selectively coupled to the fuel tank of the vehicle being diagnosed via a fuel tank isolation valve; and wherein conducting the FTPT rationality test on the vehicle being diagnosed occurs without coupling the fuel tank in the vehicle being diagnosed to the fuel vapor canister. A fifth example of the method optionally includes any one or more or each of the first through fourth examples and further includes wherein the select crowd is determined based on a first filtering process and a second filtering process; where the first filtering process selects vehicles within a predetermined distance of the vehicle being diagnosed; and wherein the second filtering process selects vehicles from the first filtering process based on one or more conditions related to fuel tank pressure. A sixth example of the method optionally includes any one or more or each of the first through fifth examples and further includes wherein conditions related to fuel tank pressure further include one or more of at least: presence of a sealed fuel tank, an indicated fuel level within a threshold of a fuel level in the vehicle being diagnosed, a key-off condition, a time since key-off greater than a threshold key-off duration, and/or a fuel tank temperature within a threshold of a fuel tank temperature in the vehicle being diagnosed. A seventh example of the method optionally includes any one or more or each of the first through sixth examples and further includes wherein conducting the FTPT rationality test includes wireless communication between the vehicle being diagnosed and the select crowd of vehicles. An eighth example of the method optionally includes any one or more or each of the first through seventh examples and further includes wherein wireless communication between the vehicle being diagnosed and the select crowd of vehicles involves direct communication, without an intermediate step. A ninth example of the method optionally includes any one or more or each of the first through eighth examples and further includes wherein the vehicle being diagnosed sends a request for indicated fuel tank pressure changes comprising a predetermined time period from each of the vehicles comprising the select crowd; wherein the vehicle being diagnosed receives the indicated fuel tank pressure changes wirelessly from each of the vehicles comprising the select crowd; wherein a controller of the vehicle being diagnosed generates an FTPT-based pressure change trend based on the combined data from each of the vehicles that comprise the select crowd; and wherein the generated FTPT-based pressure change trend is further compared to indicated fuel tank pressure changes in the vehicle being diagnosed in order to determine whether the FTPT in the vehicle being diagnosed is functioning as desired.

Another example of a method comprises indicating fuel tank pressure changes from a fuel tank pressure transducer (FTPT) coupled to a fuel tank of a vehicle being diagnosed; during a key-off condition of the vehicle being diagnosed, sending a wireless request to a select crowd of vehicles within a predetermined distance of the vehicle being diagnosed, the wireless request including information pertaining to fuel tank pressure changes in each of the vehicles comprising the select crowd over a predetermined time duration; receiving wireless responses from the select crowd of vehicles; and indicating whether the FTPT in the vehicle being diagnosed is functioning as desired based on the responses received from the select crowd and the fuel pressure changes from the FTPT. In a first example of the method, the method further includes wherein an FTPT-based pressure change trend is generated from the information received from each of the vehicles comprising the select crowd; and wherein the FTPT-based pressure change trend includes an average pressure change magnitude and direction. A second example of the method optionally includes the first example and further comprises determining whether the generated FTPT-based pressure change trend is greater than, or less than, a predetermined threshold pressure change; and responsive to the generated FTPT-based pressure change trend being less than the predetermined threshold pressure change: indicating an inconclusive diagnostic responsive to an indicated pressure change in the vehicle being diagnosed correlating with the FTPT-based pressure change trend; and indicating a fault responsive to the indicated pressure change in the vehicle being diagnosed not correlating with the FTPT-based pressure change trend. A third example of the method optionally includes any one or more or each of the first and second examples and further comprises responsive to the generated FTPT-based pressure change trend being greater than the predetermined threshold change: indicating the FTPT in the vehicle being diagnosed is functioning as desired responsive to an indicated pressure change in the vehicle being diagnosed correlating with the FTPT-based pressure change trend; and indicating a fault responsive to the indicated pressure change in the vehicle being diagnosed not correlating with the FTPT-based pressure change trend. A fourth example of the method optionally includes any one or more or each of the first through third examples and further includes wherein the select crowd is determined based on a first filtering process and a second filtering process; where the first filtering process selects vehicles within a predetermined distance of the vehicle being diagnosed; wherein the second filtering process selects vehicles from the first filtering process based on one or more conditions related to fuel tank pressure; wherein conditions related to fuel tank pressure further include one or more of at least a presence of a sealed fuel tank, an indicated fuel level within a threshold of a fuel level in the vehicle being diagnosed, a key-off condition, a time since key-off greater than a threshold key-off duration, and/or a fuel tank temperature within a threshold of a fuel tank temperature in the vehicle being diagnosed; wherein both the first filtering process and the second filtering process are conducted via wireless communication between the vehicle being diagnosed and a plurality of vehicles in wireless communication with the vehicle being diagnosed.

An example of a system for a hybrid vehicle comprises a fuel tank coupled to a fuel vapor canister via a conduit; a fuel tank temperature sensor positioned in the fuel tank; a fuel tank isolation valve positioned within the conduit between the fuel tank and the fuel vapor canister and configured to seal the fuel tank from the fuel vapor canister and from atmosphere when closed; a fuel tank pressure transducer (FTPT) positioned in a vapor recovery line between the fuel tank and the fuel tank isolation valve; a wireless communication device; and a controller configured with instructions stored in non-transitory memory, that when executed cause the controller to: indicate a key-off condition greater than a predetermined key-off duration; send a wireless request to a plurality of vehicles equipped with wireless communication capabilities within a predetermined distance to the vehicle in order to obtain information pertaining to fuel tank pressure changes in each of the plurality of vehicles; generate a select crowd of vehicles based on the information pertaining to fuel tank pressure changes; and compare fuel tank pressure data from the select crowd to fuel tank pressure changes in the hybrid vehicle as indicated by the FTPT in the hybrid vehicle in order to indicate whether the hybrid vehicle FTPT is functioning as desired. In a first example, the system further includes wherein information pertaining to fuel tank pressure changes in each of the plurality of vehicles includes the presence or absence of a sealed fuel tank, fuel level, whether a key-off condition is indicated, an indicated time since key-off, fuel tank temperature, and ambient temperature/humidity and weather conditions in the vicinity of each of the plurality of vehicles; and wherein the controller further stores instructions in non-transitory memory, that when executed, cause the controller to: exclude certain vehicles within the plurality of vehicles from the select crowd responsive to one or more of an absence of a sealed fuel tank, fuel level outside of a threshold fuel level, a key-on condition, a key-off condition for less than a predetermined threshold key-off duration, fuel tank temperature outside of a threshold fuel tank temperature, and ambient temperature/humidity and weather conditions different than that of the hybrid vehicle. A second example of the system optionally includes the first example and further includes wherein the threshold fuel level, threshold fuel tank temperature, and threshold key-off duration are based on a fuel level, fuel tank temperature, and a key-off duration in the hybrid vehicle. A third example of the system optionally includes any one or more or each of the first and second examples and further includes wherein the controller further stores instructions in non-transitory memory, that when executed, cause the controller to: generate a fuel tank pressure change trend from the fuel tank pressure data acquired from vehicles comprising the select crowd; where the fuel tank pressure change trend comprises a direction and magnitude of averaged fuel tank pressure change; and wherein comparing fuel tank pressure data from the select crowd to fuel tank pressure changes in the hybrid vehicle includes determining whether the fuel tank pressure change in the hybrid vehicle correlates with the direction and magnitude of the fuel tank pressure trend. A fourth example of the system optionally includes any one or more or each of the first through third examples and further includes wherein the controller further stores instructions in non-transitory memory, that when executed, cause the controller to: in a first condition, including the fuel tank pressure change trend greater than a threshold: indicate the hybrid vehicle FTPT is functioning as desired responsive to the fuel tank pressure change in the hybrid vehicle correlating with the fuel tank pressure change trend, and indicate a fault responsive to the fuel tank pressure change in the hybrid vehicle not correlating with the fuel tank pressure change trend; and in a second condition, including the fuel tank pressure change trend lower than the threshold: indicate an inconclusive diagnostic test responsive to the hybrid vehicle FTPT correlating with the fuel tank pressure change trend, and indicate a fault responsive to the fuel tank pressure change in the hybrid vehicle not correlating with the fuel tank pressure change trend.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
with a vehicle stationary and in a vehicle-off condition, sealing a fuel tank and conducting a fuel system diagnostic based on vehicle-to-vehicle communication where a controller of the vehicle wirelessly acquires a set of fuel tank pressure data from a plurality of other vehicles selected via the controller based on a distance from the vehicle and one or more conditions related to fuel tank pressure, and compares the set of fuel tank pressure data to data from a fuel tank pressure sensor of the vehicle;
maintaining the fuel tank sealed and indicating an absence of fuel system degradation responsive to the set of fuel tank pressure data from the plurality of other vehicles correlating with the data from the fuel tank pressure sensor as determined via the controller; and
responsive to the controller determining that the set of fuel tank pressure data is not correlated with the data from the fuel tank pressure sensor, unsealing the fuel tank and indicating whether the fuel tank pressure sensor is degraded based on a pressure as monitored via the fuel tank pressure sensor.

2. The method of claim 1, wherein selecting the plurality of other vehicles based on the distance includes excluding vehicles from being selected that are outside a predetermined distance from the vehicle.

3. The method of claim 1, wherein wirelessly acquiring the set of fuel tank pressure data from the plurality of other vehicles involves direct communication between the vehicle and the plurality of other vehicles.

4. The method of claim 1, where wirelessly acquiring the set of fuel tank pressure data from the plurality of other vehicles involves multi-hop communication between the vehicle and the plurality of other vehicles.

5. The method of claim 1, wherein the vehicle-to-vehicle communication additionally or alternatively includes vehicle-to-infrastructure-to-vehicle communication.

6. The method of claim 1, where the data from the fuel tank pressure sensor correlating with the set of fuel tank pressure data from the plurality of other vehicles includes the set of fuel tank pressure data from the plurality of other vehicles having a similar direction and magnitude of change, within error margins, as the data from the fuel tank pressure sensor.

7. The method of claim 1, wherein the one or more conditions related to fuel tank pressure includes vehicle make/model.

8. The method of claim 1, wherein the one or more conditions related to fuel tank pressure includes one or more of proximity to structures which affect temperature and/or ambient conditions, presence of a sealed fuel tank, a fuel level within a threshold of another fuel level in the fuel tank of the vehicle, and/or a time since key-off greater than a threshold key-off duration.

9. The method of claim 1, further
indicating the fuel tank pressure sensor is functioning as desired and a presence of undesired evaporative emissions stemming from the fuel tank in response to the pressure in the fuel tank decaying to atmospheric pressure upon unsealing the fuel tank; and
indicating that the fuel tank pressure sensor is not functioning as desired in response to the pressure in the fuel tank not decaying to atmospheric pressure upon unsealing the fuel tank.

10. A method comprising:
during an engine-off condition, sealing a fuel tank and monitoring a pressure in the fuel tank via a fuel tank pressure transducer, and in response to a pressure change greater than a threshold pressure change, conducting a fuel system diagnostic via vehicle-to-vehicle (V2V) or vehicle-to-infrastructure-to-vehicle (V2I2V) communications between a vehicle and a crowd of vehicles selected via a controller of the vehicle via the V2V and/or V2I2V communications, where the V2V and/or V2I2V communications further include wirelessly retrieving a set of fuel tank pressure data from the crowd over a predetermined time frame;
wherein conducting the fuel system diagnostic includes comparing, via the controller, the set of fuel tank pressure data from the crowd to fuel tank pressure data from the vehicle; and
in response to the set of fuel tank pressure data from the crowd not correlating within error margins with the fuel tank pressure data from the vehicle, unsealing the fuel tank and indicating a source of undesired evaporative emissions stemming from the fuel tank responsive to the pressure in the fuel tank decaying to atmospheric pressure as indicated via the fuel tank pressure transducer.

11. The method of claim 10, wherein the crowd is selected via the controller selecting a first subset of vehicles within a predetermined distance of the vehicle, and then selecting a second subset from the first subset based on one or more other conditions.

12. The method of claim 11, wherein the one or more other conditions include one or more of at least vehicle make/model being the same as the vehicle, a key-off condition, a time since key-off greater than a threshold key-off duration, and/or a presence of a sealed fuel system.

13. The method of claim 10, further comprising
indicating that the fuel tank pressure transducer is not functioning as desired responsive to the set of fuel tank pressure data from the crowd not correlating within the error margins with the fuel tank pressure data from the vehicle, and further in response to the pressure in the fuel tank not decaying to atmospheric pressure responsive to unsealing the fuel tank.

14. The method of claim 13, further comprising indicating that the fuel tank pressure transducer is functioning as desired and an absence of the source of undesired evaporative emissions in response to the set of data from the crowd correlating within the error margins with the fuel tank pressure data from the vehicle.

15. The method of claim 10, further comprising maintaining the fuel tank of the vehicle sealed in response to the set of fuel tank pressure data from the crowd correlating within the error margins with the fuel tank pressure data from the vehicle.

16. The method of claim 10, further comprising capturing vapors from the fuel tank of the vehicle in a fuel vapor storage canister in response to unsealing the fuel tank of the vehicle.

17. A system for a vehicle, comprising:
- a fuel tank selectively fluidically coupled to a fuel vapor storage canister and to atmosphere via a fuel tank isolation valve, and a fuel tank pressure transducer for monitoring a fuel tank pressure; and
- a controller, with computer readable instructions stored in non-transitory memory that, when executed, cause the controller to:
- seal the fuel tank via commanding closed the fuel tank isolation valve and during a key-off condition where the fuel tank pressure changes by more than a threshold change, send a wireless request via one of vehicle-to-vehicle (V2V) or vehicle-to-infrastructure-to-vehicle (V2I2V) communications to a plurality of vehicles equipped with wireless communication capabilities within a predetermined distance of the vehicle;
- generate a subset of vehicles from the plurality of vehicles based on the wireless request, the wireless request including data pertaining to fuel tank pressure;
- retrieve one or more data sets pertaining to fuel tank pressure from the subset of vehicles; and
- compare the one or more data sets from the subset of vehicles to a set of fuel tank pressure data from the vehicle, and in response to data from the one or more data sets not correlating with the set of fuel tank pressure data from the vehicle, command open the fuel tank isolation valve and indicate that the fuel tank pressure transducer is not functioning as desired in response to the fuel tank pressure not decaying to atmospheric pressure.

18. The system of claim 17,
wherein the controller stores further instructions to exclude vehicles from the subset of vehicles responsive to one or more of an absence of a sealed fuel tank, fuel level outside of a threshold fuel level, a key-on condition, a key-off condition for less than a predetermined threshold key-of duration, fuel tank temperature outside of a threshold fuel tank temperature, and temperature/humidity and weather conditions different than that of the vehicle.

19. The system of claim 17, wherein the controller stores further instructions to indicate a source of undesired evaporative emissions stemming from the fuel tank of the vehicle in response to the fuel tank pressure decaying to atmospheric pressure responsive to commanding open the fuel tank isolation valve; and
wherein the controller stores further instructions to maintain the fuel tank isolation valve closed and indicate an absence of the source of undesired evaporative emissions and that the fuel tank pressure transducer is functioning as desired in response to data from the one or more data sets correlating with the set of fuel tank pressure data from the vehicle.

* * * * *